(12) United States Patent
Hälleberg et al.

(10) Patent No.: US 7,991,537 B2
(45) Date of Patent: Aug. 2, 2011

(54) METHOD FOR ADJUSTING A LOOKUP TABLE AND A SYSTEM FOR CONTROLLING AN INJECTOR OF A CYLINDER IN A COMBUSTION ENGINE

(75) Inventors: Roger Hälleberg, Nacka (SE); Klas Telborn, Södertälje (SE)

(73) Assignee: Scania CV AB (SE)

( * ) Notice: Subject to any disclaimer, the term of this patent is extended or adjusted under 35 U.S.C. 154(b) by 387 days.

(21) Appl. No.: 12/296,175

(22) PCT Filed: Mar. 7, 2007

(86) PCT No.: PCT/SE2007/050129
§ 371 (c)(1),
(2), (4) Date: Jan. 15, 2009

(87) PCT Pub. No.: WO2007/117207
PCT Pub. Date: Oct. 18, 2007

(65) Prior Publication Data
US 2009/0182487 A1    Jul. 16, 2009

(30) Foreign Application Priority Data

Apr. 7, 2006  (SE) ...................................... 0600789

(51) Int. Cl.
*F02D 41/14*   (2006.01)
*G06F 19/00*   (2011.01)
(52) U.S. Cl. ................. 701/104; 701/115; 123/486
(58) Field of Classification Search .......... 123/299, 123/300, 304, 478, 480, 486, 672–675, 679; 701/101–105, 109–111, 115; 702/182, 183
See application file for complete search history.

(56) References Cited

U.S. PATENT DOCUMENTS

| | | | | |
|---|---|---|---|---|
| 4,977,881 A | * | 12/1990 | Abe et al. | 123/674 |
| 6,035,252 A | * | 3/2000 | Dixon et al. | 701/102 |
| 6,161,530 A | * | 12/2000 | Kakizaki et al. | 123/674 |
| 6,704,641 B2 | * | 3/2004 | Tashiro et al. | 701/110 |

(Continued)

FOREIGN PATENT DOCUMENTS

| | | |
|---|---|---|
| EP | 0904972 A2 | 3/1999 |
| WO | WO 00/73642 A2 | 12/2000 |

OTHER PUBLICATIONS

International Search Report dated May 18, 2007, issued in corresponding international application No. PCT/SE2007/050129.

*Primary Examiner* — Willis R Wolfe, Jr.
(74) *Attorney, Agent, or Firm* — Ostrolenk Faber LLP (57) ABSTRACT

A method for adjusting a lookup table that includes preset on-time values for an injector of an engine linked to fuel injection quantity values (δ). The following steps are executed in a situation when the output shaft of the engine is disconnected from the output shaft of the gearbox. A torque loss value ($T_{loss}$) and a combustion efficiency value ($\epsilon_F$) are determined or received. An actual fuel injection quantity value ($\delta_{actual}$) is calculated, based on the torque loss value and the combustion efficiency value. An on-time value (tg) linked to the actual fuel injection quantity value is determined from the lookup table and the on-time value is compared with a presently applied on-time value (tb) that is established by an engine control with the aid of a regulator and the lookup table. The lookup table is adjusted based on the result of the comparison.

16 Claims, 2 Drawing Sheets

U.S. PATENT DOCUMENTS

| | | | |
|---|---|---|---|
| 6,993,427 B2 * | 1/2006 | Ueda | 701/111 |
| 7,054,738 B1 * | 5/2006 | Stotsky | 701/115 |
| 7,236,874 B2 * | 6/2007 | Ichihara | 701/112 |
| 7,437,234 B2 * | 10/2008 | Halleberg | 701/104 |
| 2004/0025849 A1 | 2/2004 | West et al. | |
| 2004/0089273 A1 * | 5/2004 | Tonetti et al. | 123/480 |

* cited by examiner

METHOD FOR ADJUSTING A LOOKUP TABLE AND A SYSTEM FOR CONTROLLING AN INJECTOR OF A CYLINDER IN A COMBUSTION ENGINE

CROSS REFERENCE TO RELATED APPLICATION

The present application is a 35 U.S.C. §371 national phase conversion of PCT/SE2007/050129 filed on Mar. 7, 2007, which claims priority of Swedish Application No. 0600789-2, filed Apr. 7, 2006, the entire contents of which are hereby incorporated by reference. The PCT International Application was published in the English Language.

BACKGROUND OF THE INVENTION

The present invention relates to a method for adjusting a lookup table comprising preset on-time values for an injector of a cylinder in a combustion engine of a motor vehicle linked to fuel injection quantity values, where the fuel injection quantity values represent different desired quantities of fuel to be injected into the cylinder and the on-time values represent the associated on-times for the injector. The invention also relates to a system for controlling an injector of a cylinder in a combustion engine of a motor vehicle. Furthermore, the invention relates to a computer program comprising computer program code for implementing the method, a computer program product comprising a data storage medium readable by an electronic control unit and having said computer program stored thereon, and an electronic control unit.

In this description and the subsequent claims, the term "on-time" refers to the opening time of an injector, i.e. the duration of the time period during which the injector is kept open in order to inject fuel into the associated cylinder in connection with a single working stroke. The quantity of fuel injected into a cylinder in connection with a working stroke depends on the length of this on-time and the pressure of the fuel supplied to the injector.

A conventional combustion engine for a motor vehicle, such as for instance a car, lorry, towing vehicle or bus, is provided with injectors for injecting desired quantities of fuel at desired moments into the cylinders of the engine. The injectors are controlled by means of an engine control unit, which controls the on-times for each individual injector so as to thereby control the quantity of fuel to be injected into the cylinder associated with the injector. It is a common practice to establish suitable on-times for the injectors with the aid of a lookup table comprising preset on-time values for the injectors linked to fuel injection quantity values, where the fuel injection quantity values represent different desired quantities of fuel to be injected into each cylinder of the engine and the on-time values represent the associated on-times for each injector. For a common rail fuel injection system, the on-times of such a lookup table are linked both to such fuel injection quantity values and to common rail pressure values representing different fuel pressures in the common rail. The engine control unit determines the present fuel injection quantity value, i.e. the desired quantity of fuel to be injected by an injector at the present working stroke, with the aid of a regulator in dependence on the present operating conditions of the vehicle. Based on the present fuel injection quantity value and, in case of a common rail fuel injection system, the present common rail pressure value, the engine control unit will establish a present on-time for an injector with the aid of said lookup table. This on-time is expected to result in the injection of the desired fuel quantity, i.e. a fuel quantity corresponding to said present fuel injection quantity value. However, in course of time, the characteristics of the injectors may change in such a manner that the preset on-time values of the lookup table will not give the expected fuel injection quantities. Such deviations between expected and actual fuel injection quantities may result in uneven idling and lost pilot or post injections.

SUMMARY OF THE INVENTION

An object of the present invention is to propose a solution that allows an adjustment of a lookup table comprising preset on-time values for an injector of a cylinder in a combustion engine of a motor vehicle linked to fuel injection quantity values so as thereby make possible an improved accuracy in the control of the quantity of fuel injected by the injector.

This object is achieved by a method and a system having features described herein.

The inventive solution involves the execution of the following steps in a situation when the output shaft of the engine is disconnected from the output shaft of the vehicle's gearbox:

A) determining or receiving a torque loss value $T_{loss}$ representing the present torque loss of the engine under the present operating conditions of the vehicle and a combustion efficiency value $\epsilon_F$ representing the present combustion efficiency of a cylinder of the engine under the present operating conditions;

B) calculating, based on the torque loss value $T_{loss}$ and the combustion efficiency value $\epsilon_F$, an actual fuel injection quantity value $\delta_{actual}$ representing the actual quantity of fuel injected into the cylinder;

C) determining from the lookup table the on-time value $t_a$ linked to the actual fuel injection quantity value $\delta_{actual}$ and comparing this on-time value $t_a$ with the presently applied on-time value $t_b$ for the injector of the cylinder established by the engine control means with the aid of the regulator and said lookup table in dependence on the present operating conditions; and D) adjusting the lookup table in dependence on the result of said comparison.

The inventive solution implies that the on-time value in the lookup table corresponding to the fuel quantity actually injected by an injector is compared with the on-time value actually applied in the control of the injector. If this comparison shows that these on-time values deviate too much from each other, the lookup table will be adjusted so as to secure that at least the on-time value linked to the fuel injection quantity value corresponding to said actual fuel injection quantity value will give an injected fuel quantity that better corresponds to the expected quantity.

With the inventive solution, the adjustment of said lookup table may be accomplished by modifications in the software already provided in a modern vehicle, without requiring any installation of new sensors or hardware in the vehicle. Thus, the inventive solution may be implemented at rather low costs. With the inventive solution, the lookup table in question may be adjusted so as to offer improved accuracy in the control of the quantity of fuel injected by the injectors of a vehicle engine, which will make it possible to achieve an improved idling control with a more smooth idling speed and a better accuracy of the vehicle's driving computer with respect to the registration of consumed fuel quantity.

According to an embodiment of the invention, said steps A-D are executed in a situation when the output shaft of the engine is disconnected from the output shaft of the vehicle's gearbox and the engine is idling. Hereby, the accuracy in the torque loss value and thereby the accuracy in the adjustment of the lookup table will be improved.

According to another embodiment of the invention, a difference value $\Delta t$ representing the difference between said present on-time value $t_b$ and said on-time value $t_a$ determined in step C is established, and at least the on-time value linked to the fuel injection quantity value corresponding to said actual fuel injection quantity value $\delta_{actual}$ is adjusted in said lookup table by adding this difference value $\Delta t$ to this on-time value. Hereby, the lookup table may be adjusted in a simple manner based on the deviation between said on-time values.

According to another embodiment of the invention, several adjustment cycles, each of which comprising said steps A-D, are performed for mutually different values of the torque loss value $T_{loss}$, the torque loss value $T_{loss}$ being varied between different adjustment cycles preferably by adjusting the gas exchange work of the engine. The gas exchange work may easily be adjusted by regulating the exhaust back pressure by means of a valve arranged in the exhaust line from the engine. Hereby, a large part of the lookup table may easily be subjected to adjustment.

Further advantageous features of the inventive method and the inventive system will appear from the dependent claims and the following description.

The invention also relates to a computer program having features described herein, a computer program product having features described herein and an electronic control unit having features described herein.

Another object of the present invention is to propose a solution that allows an adjustment of a calculation model used for calculating the on-time values for an injector of a cylinder in a combustion engine of a motor vehicle based on a fuel injection quantity value representing a desired quantity of fuel to be injected into the cylinder, i.e. a calculation model having the fuel injection quantity value as an input parameter, so as thereby make possible an improved accuracy in the control of the quantity of fuel injected by the injector.

In one embodiment, an object is achieved by a method described herein. This inventive solution involves the execution of the following steps in a situation when the output shaft of the engine is disconnected from the output shaft of the vehicle's gearbox:

A) determining or receiving a torque loss value representing the present torque loss of the engine under the present operating conditions of the vehicle and a combustion efficiency value representing the present combustion efficiency of the cylinder under the present operating conditions;

B) calculating, based on the torque loss value and the combustion efficiency value, an actual fuel injection quantity value representing the actual quantity of fuel injected into the cylinder;

C) determining an on-time value by means of said calculation model based on the actual fuel injection quantity value and comparing this on-time value with the presently applied on-time value for the injector established by the engine control means with the aid of the regulator and said calculation model in dependence on the present operating conditions; and D) adjusting the calculation model in dependence on the result of said comparison.

BRIEF DESCRIPTION OF DRAWINGS

The invention will in the following be more closely described by means of embodiment examples, with reference to the appended drawings, where.

DETAILED DESCRIPTION OF THE INVENTION

The invention will in the following be described with reference to a vehicle engine provided with a common rail fuel injection system. However, it should be realized that the invention also is applicable to vehicle engines having other types of fuel injection systems where the injectors are not connected to a common rail.

Figure 1:
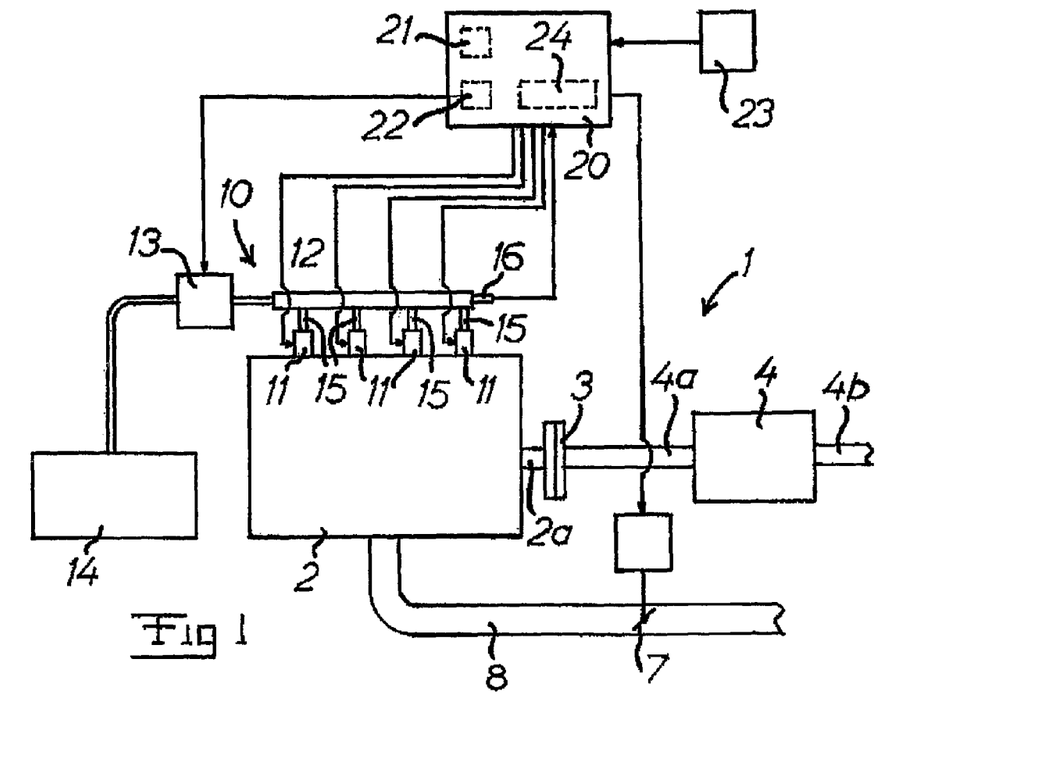
FIG. 1 is a schematic diagram of a combustion engine with a common rail fuel injection system.

A part of a drive line 1 of a motor vehicle is schematically illustrated in FIG. 1. The drive line 1 comprises a vehicle engine 2 in the form of a conventional combustion engine, which is connected to driving wheels (not shown) of the vehicle via a clutch 3 and a gearbox 4. The output shaft 2a of the engine 2 is connected to the input shaft 4a of the gearbox via said clutch 3, which is arranged to transfer the torque exerted by the engine to the input shaft 4a of the gearbox. The output shaft 4b of the gearbox is connected to said driving wheels.

The engine 2 comprises a plurality of cylinders. Although FIG. 1 schematically illustrates a four-cylinder engine as an example, the engine 2 may comprise any suitable number of cylinders. In the illustrated example, fuel is supplied to the cylinders by means of a common rail fuel injection system 10. This fuel injection system 10 comprises a number of electrically controlled injectors 11. Each cylinder of the engine 2 is associated with its own injector 11. The injectors 11 are connected to a common rail 12, which constitutes an accumulator for accumulating high-pressure fuel to be supplied to the injectors. The common rail 12 is supplied with high-pressure fuel by a pump 13, which receives fuel from the fuel tank 14 of the vehicle. The injectors 11 are connected to the common rail 12 via fuel pipes 15 branching from the common rail so as to inject high-pressure fuel accumulated in the common rail 12 into the respective cylinders.

Figure 2:
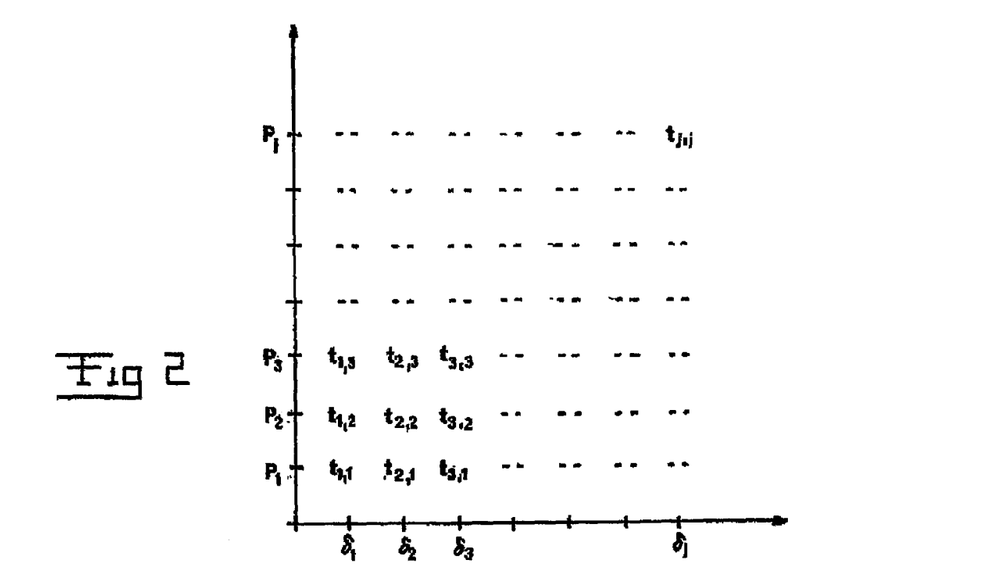
FIG. 2 is a schematic visualization of a lookup table for on-time values.

The invention is applicable to vehicles having fuel injection systems where the on-times of the injectors 11 are controlled by engine control means 20, e.g. in the form of an electronic control unit, with the aid of a lookup table comprising preset on-time values t for an injector linked to fuel injection quantity values $\delta$, where said fuel injection quantity values $\delta$ represent different desired quantities of fuel to be injected into a cylinder of the engine 2 and the on-time values t represent the associated on-times for the injector 11 of the cylinder. Such a lookup table is stored on a data storage medium 21 in the engine control means 20 and is visualized in FIG. 2. In the illustrated example, each on-time value t in the lookup table is linked to a fuel injection quantity values $\delta$ and a common rail pressure value P, where said common rail pressure value represents the fuel pressure in the common rail 12 of a common rail fuel injection system. For a specific combination of fuel injection quantity value $\delta_i$ and common rail pressure value $P_j$, the lookup table will give an on-time $t_{i,j}$ for the injector 11, which on-time $t_{i,j}$ is expected to result in the injection into the associated cylinder of a fuel quantity corresponding to the specified fuel injection quantity value $\delta_i$ in question at a common rail pressure corresponding to the specified common rail pressure value $P_j$. Such a lookup table is established by the vehicle manufacturer in a manner well known to persons skilled in the art.

The present fuel injection quantity value δ, i.e. the desired quantity of fuel to be injected into a cylinder at the present moment, is determined in a conventional manner by the engine control means 20 with the aid of a regulator 22 in dependence on the present operating conditions of the vehicle. Said regulator 22 is for instance a conventional PID-regulator or any other suitable type of regulator implemented in the form of software or hardware or a combination of software and hardware. When the engine 2 is idling, the regulator 22 controls the injected fuel quantity so as to keep the rotational speed of the engine at the predetermined idling speed. The engine control means 20 is connected to different types of sensors, commonly indicated by the block 23 in FIG. 1, which provide the engine control means 20 with information as to different operating parameters of the vehicle that influence the magnitude of the fuel injection quantity value δ. The engine control means 20 is also connected to a pressure sensor 16, which provides the engine control means 20 with information as to the common rail pressure, i.e. the fuel pressure in the common rail 12. Based on the present fuel injection quantity value δ established with the aid of the regulator 22 and the present common rail pressure value P, the engine control means 20 will establish a present on-time value $t_b$ for an injector 11 with the aid of the above-indicated lookup table.

The desired fuel pressure in the common rail 12 depends on the present operating conditions of the vehicle and is controlled by the engine control means 20 via the pump 13.

According to the invention, the engine control means 20 comprises processing means 24 adapted to execute the following steps in a situation when the output shaft 2a of the engine is disconnected from the output shaft 4b of the vehicle's gearbox, i.e. when the gearbox 4 is in the neutral or when the clutch 3 is disengaged:

A) determine or receive a torque loss value $T_{loss}$ representing the present torque loss of the engine 2 under the present operating conditions of the Fvehicle and a combustion efficiency value $\epsilon_F$ representing the present combustion efficiency of a cylinder of the engine under the present operating conditions;

B) calculate, based on the torque loss value $T_{loss}$ and the combustion efficiency value $\epsilon_F$, an actual fuel injection quantity value $\delta_{actual}$ representing the actual quantity of fuel injected into the cylinder;

C) determine from said lookup table the on-time value $t_a$ linked to the actual fuel injection quantity value $\delta_{actual}$, and compare this on-time value $t_a$ with the presently applied on-time value $t_b$ for the injector 11 of the cylinder established by the engine control means 20 with the aid of the regulator 22 and said lookup table in dependence on the present operating conditions; and D) adjust the lookup table in dependence on the result of said comparison.

The quantity of fuel actually injected by an injector 11 at a specific working stroke is calculated in the above-indicated step B based on the present torque loss value $T_{loss}$ and the present combustion efficiency value $\epsilon_F$. This calculation is based on the fact that $\delta_{actual}[mg/stroke]=T_{loss}[Nm]/\epsilon_F[Nm/mg/stroke]$ when the output shaft 2a of the engine is disconnected from the output shaft 4b of the gearbox. The torque loss of the engine 2 and the combustion efficiency of each cylinder of the engine are normally calculated continuously by the engine control unit of a modern motor vehicle in a manner well known to persons skilled in the art by calculation models in dependence on the present operating conditions of the vehicle. Thus, a torque loss value $T_{loss}$ and combustion efficiency value $\epsilon_F$ already available in the engine control unit of a modern vehicle may be used in the implementation of the inventive solution. The calculation of the torque loss value and the combustion efficiency value may be performed in a manner well known to persons skilled in the art and will not be more closely described here. The torque loss of the engine constitutes the torque required for running the engine 2 when the engine output shaft 2a is disconnected from the output shaft 4b of the vehicle's gearbox. The torque loss may comprise one part associated with the friction losses in the engine, one part associated with the gas exchange work of the engine cylinders, one part associated with heat losses in the engine cylinders, one part associated with the operational state of different units of the vehicle that are driven by the engine and one part associated with the moment of inertia of the engine. Each one of said parts is calculated by a calculation model in dependence on the present operating conditions of the vehicle and the torque loss constitutes the sum of said parts. The calculation of the torque loss is more accurate when the engine 2 is idling than when not idling. Therefore, the above-indicated steps A-D and steps A2-D2 indicated below are with advantage executed in a situation when the output shaft 2a of the engine is disconnected from the output shaft 4b of the vehicle's gearbox and the engine 2 is idling.

In the above-indicated step C, the actual fuel injection quantity value $\delta_{actual}$ calculated in step B is used as an input value in the above-indicated lookup table in order to retrieve the on-time value $t_a$ of the lookup table linked to this fuel injection quantity value $\delta_{actual}$. If the injectors 11 of the engine form part of a common rail fuel injection system, the actual fuel injection quantity value $\delta_{actual}$ is used as an input value in said lookup table together with the present common rail pressure value P established with the aid of the above-indicated pressure sensor 16. If the lookup table gives a correct on-time value $t_a$, this on-time value should be equal to or at least essentially equal to the on-time value $t_b$ presently applied to an injector 11 by the engine control means 20, i.e. the present on-time value established by the engine control means 20 with the aid of the regulator 22 and said lookup table in dependence on the present operating conditions of the vehicle. Thus, a comparison between said on-time value $t_a$ and said presently applied on-time value $t_b$ will give a measure of the correctness of the lookup table. The relevant part of the lookup table is then adjusted in dependence on the result of said comparison if the comparison indicates that such an adjustment is necessary.

With advantage, a difference value Δt representing the difference between said present on-time value $t_b$ and said on-time value $t_a$ determined in step C is established, whereupon at least the on-time value linked to the fuel injection quantity value corresponding to said actual fuel injection quantity value $\delta_{actual}$ and, whenever applicable, the present common rail pressure value P is adjusted in said lookup table by adding this difference value Δt to this on-time value. Other on-time values of the lookup table closely linked to the fuel injection quantity value corresponding to said actual fuel injection quantity value $\delta_{actual}$ and, whenever applicable, the present common rail pressure value P may also be adjusted in said lookup table based on this difference value Δt.

When the injectors 11 form part of a common-rail fuel injection system 10, the respective injector 11 may be controlled by the engine control means 20 to use a so-called pilot injection of a smaller quantity of fuel and a subsequent main injection of a larger quantity of fuel for a single working stroke. There is a lower limit for the torque loss value $T_{loss}$ of the engine 2 and thus a lower limit for the actual fuel injection quantity value $\delta_{actual}$ that can be achieved, which implies that the lowest on-time values in the lookup table linked to the smallest fuel injection quantity values δ can not be adjusted by means of an adjustment cycle comprising only the above-indicated steps A-D. However, such low on-time values can be adjusted in the manner described in the following. A first adjustment cycle comprising said steps A-D is performed using only a main injection of fuel, whereupon a second adjustment cycle is performed using a pilot injection and a main injection of fuel and with the same common rail pressure as in the first adjustment cycle. The engine control means 20 is made to set a main fuel injection quantity value $\delta_{main}$, which represents the desired quantity of fuel to be injected into a cylinder of the engine by the main injection during the second adjustment cycle, to correspond to the actual fuel injection quantity value $\delta_{actual}$ established in step B in the first adjustment cycle and allow a pilot fuel injection quantity value $\delta_{pilot}$, which represents the desired quantity of fuel to be injected into a cylinder of the engine by the pilot injection during the second adjustment cycle, to be determined by the engine control means 20 with the aid of the regulator 22 in dependence on the present operating conditions of the vehicle. The second adjustment cycle involves the execution of the following steps in a situation when the output shaft 2a of the engine is disconnected from the output shaft 4b of the vehicle's gearbox:

A2) determining or receiving a torque loss value $T_{loss}$ representing the present torque loss of the engine under the present operating conditions of the vehicle and a combustion efficiency value $\epsilon_F$ representing the present combustion efficiency of a cylinder of the engine under the present operating conditions;

B2) calculating, based on the torque loss value $T_{loss}$, the combustion efficiency value $\epsilon_F$ and the main fuel injection quantity value $\delta_{main}$, an actual fuel injection quantity value $\delta_{pilot,actual}$ for the pilot injection representing the actual quantity of fuel injected into the cylinder by the pilot injection;

C2) determining from said lookup table the on-time value $t_{pilot,a}$ linked to said actual fuel injection quantity value $\delta_{pilot,actual}$ for the pilot injection and comparing this on-time value $t_{pilot,a}$ with the presently applied on-time value $t_{pilot,b}$ for the pilot injection of the injector 11 of the cylinder established by the engine control means 20 with the aid of the regulator 22 and said lookup table in dependence on the present operating conditions; and D2) adjusting the lookup table in dependence on the result of the comparison in step C2, e.g. by means of a difference value in a manner corresponding to the manner described above with reference to the above-indicated step D.

The quantity of fuel actually injected by the pilot injection of an injector 11 at a specific working stroke is calculated in the above-indicated step B2 based on the present torque loss value $T_{loss}$, the present combustion efficiency value $\epsilon_F$ and said main fuel injection quantity value $\delta_{main}$. This calculation is based on the fact that $\delta_{main}+\delta_{pilot,actual}=T_{loss}/\epsilon_F$ when the output shaft 2a of the engine is disconnected from the output shaft 4b of the gearbox.

By the above-indicated adjustment of low on-time values in the lookup table, it will be possible to secure that pilot and post injections actually will result in the injection of the desired small fuel quantity. Without such adjustment, there is a risk of loosing a pilot and/or post injection.

Preferably, several adjustment cycles, each of which comprising said steps A-D possibly in combination with said steps A2-D2, are performed for mutually different values of the torque loss value $T_{loss}$ in order to vary the actual fuel injection quantity value $\delta_{actual}$ between different adjustment cycles and thereby allow the adjustment of on-time values t of the lookup table linked to different fuel injection quantity values δ.

The gas exchange work, i.e. the work consumed for blowing combustion gases out of the cylinders and introducing new gas therein after the working strokes, contributes to the torque loss of the engine 2 and is calculated in a manner well known to persons skilled in the art by a calculation model having engine inlet pressure, exhaust back pressure, cylinder volume and engine rotational speed as input parameters. Thus, the torque loss value $T_{loss}$ may be varied between different adjustment cycles by adjusting the gas exchange work of the engine 2, which is suitably accomplished by regulating the exhaust back pressure by means of a valve 7 arranged in the exhaust line 8 from the engine 2. The valve may be a so-called exhaust brake or a part of a variable geometry turbine. In the example illustrated in FIG. 1, this valve 7 is controlled by the engine control means 20. Alternatively, the torque loss value $T_{loss}$ may be varied between different adjustment cycles by making the engine control means 20 adjust the rotational speed of the engine 2.

The rotational idle speed may in one embodiment temporarily be increased in order to increase the torque loss value and increase the fuel injection. Although this may sometimes be inappropriate during normal use of the vehicle, it may be perform with advantage in a workshop using a diagnostic tool to activate a control program for changing the idle speed. As an alternative or in addition to raising the idle speed, the method may comprise the step of deliberately and unevenly distribute the total amount of desired injected fuel into the cylinders such that e.g. half of the cylinders receive an increased amount of fuel and the other half of the cylinders receive a decreased amount of fuel, wherein the offset from an average fuel amount is substantially equal for the increased and decreased fuel amounts respectively. Such a so-called split fuelling method is as such known to a person skilled in the art and is explained in e.g. EP-1576271-A1. The uneven distribution increases the torque loss values for the cylinders with increased fuel injection and the look-up tables for these injectors can therefore be updated with increased precision. Thereafter, the fuel distribution may be changed so that the injectors which previously injected a decreased amount of fuel now receive an increased amount and vice-versa. In that way all injectors of the look-up tables for all injectors can be updated with increased precision.

When the injectors 11 form part of a common-rail fuel injection system 10, several adjustment cycles, each of which comprising said steps A-D possibly in combination with said steps A2-D2, are suitably also performed for mutually different values of the common rail pressure P, so as to thereby allow adjustment of a larger part of the lookup table.

Figure 4:
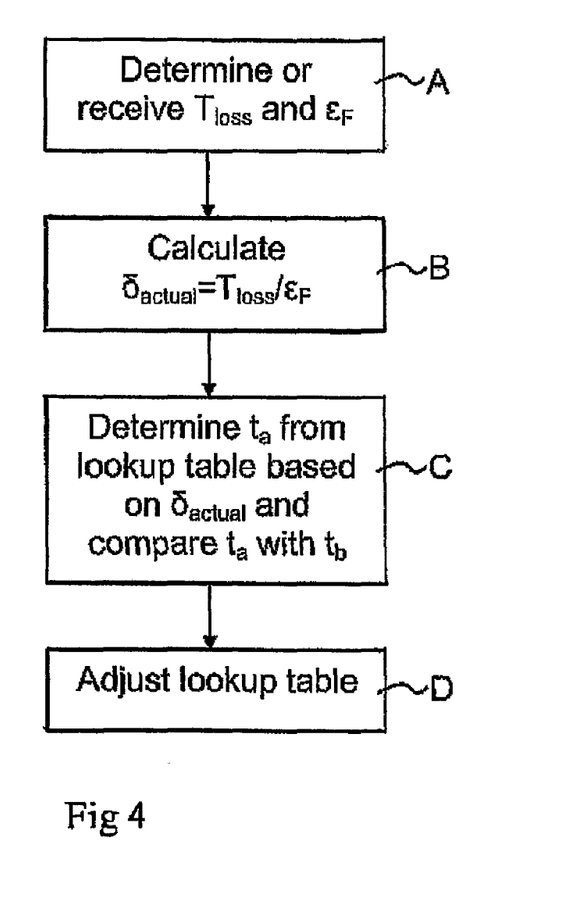
FIG. 4 is a flow diagram illustrating a method according to an embodiment of the invention.

A flow diagram illustrating a method according to an embodiment of the invention is shown in FIG. 4. In a first step A, a torque loss value $T_{loss}$ and a combustion efficiency value $\epsilon_F$ are determined or received. In a second step B, an actual fuel injection quantity value $\delta_{actual}$ is calculated based on said torque loss value $T_{loss}$ and said combustion efficiency value $\epsilon_F$. In a third step C, the on-time value $t_a$ linked to said actual fuel injection quantity value $\delta_{actual}$ is determined from the lookup table and this on-time value $t_a$ is compared with the presently applied on-time value $t_b$ established by the engine control means 20 with the aid of the regulator 22 and said lookup table in dependence on the present operating conditions. Then, in a fourth step D, the lookup table is adjusted in dependence on the result of said comparison. These steps A-D may then be repeated for new common rail pressure values and/or new torque loss values.

Computer program code for implementing a method according to the invention is suitably included in a computer program, which is loadable directly into the internal memory of a computer, such as the internal memory of an engine control unit, in a motor vehicle comprising a combustion engine having an injector of a cylinder controlled by engine control means based on a lookup table comprising preset on-time values t for the injector linked to fuel injection quantity values δ. Such a computer program is suitably provided via a computer program product comprising a data storage medium readable by an electronic control unit, which data storage medium has the computer program stored thereon. Said data storage medium is for instance an optical data storage medium in the form of a CD-ROM disc, a DVD disc etc, a magnetic data storage medium in the form of a hard disc, a diskette, a cassette tape etc, or a memory of the type ROM, PROM, EPROM or EEPROM or a Flash memory.

The computer program according to an embodiment of the invention comprises computer program code for causing said computer:

A) to determine or receive a torque loss value $T_{loss}$ representing the present torque loss of the combustion engine under the present operating conditions of the vehicle and a combustion efficiency value $\epsilon_F$ representing the present combustion efficiency of a cylinder of the engine under the present operating conditions;

B) to calculate, based on the torque loss value $T_{loss}$ and the combustion efficiency value $\epsilon_F$, an actual fuel injection quantity value $\delta_{actual}$ representing the actual quantity of fuel injected into the cylinder;

C) to determine from the lookup table the on-time value $t_a$ linked to the actual fuel injection quantity value $\delta_{actual}$, and to compare this on-time value $t_a$ with the presently applied on-time value $t_b$ for the injector of the cylinder established by the engine control means with the aid of the regulator and said lookup table in dependence on the present operating conditions; and D) to adjust the lookup table in dependence on the result of said comparison.

Figure 3:
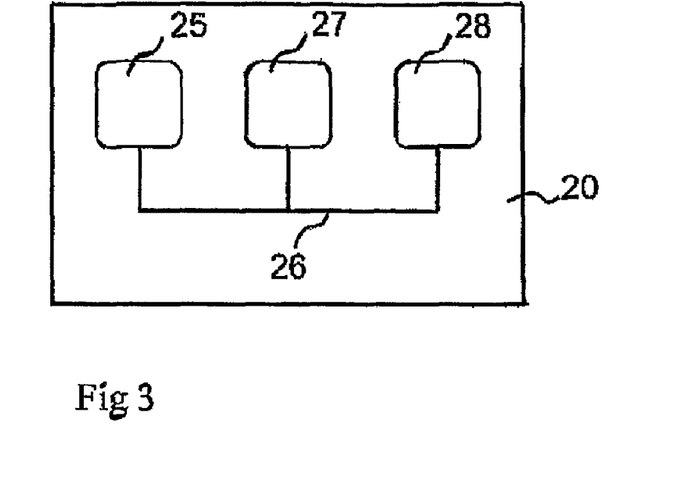
FIG. 3 is a schematic outline diagram of an electronic control unit for implementing a method according to the invention.

FIG. 3 very schematically illustrates the above-indicated engine control means 20 in the form of an electronic control unit comprising an execution means 25, such as a central processing unit (CPU), for executing computer software. The execution means 25 communicates with a memory 27, for instance of the type RAM, via a data bus 26. The control unit 20 also comprises data storage medium 28, for instance in the form of a memory of the type ROM, PROM, EPROM or EEPROM or a Flash memory. The execution means 25 communicates with the data storage medium 28 via the data bus 26. A computer program comprising computer program code for implementing a method according to the invention is stored on the data storage medium 28.

The above-indicated method steps A and B could also be used in a case when a calculation model is used for calculating the on-times for an injector of a combustion engine based on a fuel injection quantity value representing the desired quantity of fuel to be injected into a cylinder of the engine, i.e. a calculation model having such a fuel injection quantity value as an input parameter. In this case, the actual fuel injection quantity value established in step B is used as an input parameter in the calculation model in order to establish the corresponding on-time value, and the thus established on-time value is then compared with the presently applied on-time value for the injector established by the engine control means with the aid of a regulator and said calculation model in dependence on the present operating conditions. The calculation model is then adjusted in dependence on the result of said comparison.

The invention is of course not in any way restricted to the embodiments described above. On the contrary, many possibilities to modifications thereof will be apparent to a person with ordinary skill in the art without departing from the basic idea of the invention as defined in the appended claims.

The invention claimed is:

1. A method for adjusting a calculation model used for calculating on-time values (t) for an injector of a cylinder in a combustion engine of a motor vehicle based on a fuel injection quantity value (δ) representing a desired quantity of fuel to be injected into the cylinder, the method comprising:

controlling the on-times for the injector by an engine control based on the calculation model;

determining the fuel injection quantity value (δ) by the engine control with the aid of a regulator based on the vehicles' present operating conditions;

determining or receiving a torque loss value ($T_{loss}$) representing a present torque loss of the engine under a present operating conditions of the vehicle and a combustion efficiency value ($\epsilon_F$) representing a present combustion efficiency of the cylinder under the present operating conditions;

calculating, based on the torque loss value ($T_{loss}$) and the combustion efficiency value ($\epsilon_F$), an actual fuel injection quantity value ($\delta_{actual}$) representing an actual quantity of fuel injected into the cylinder;

C) determining an on-time value ($t_a$) by the calculation model based on the actual fuel injection quantity value ($\delta_{actual}$) and comparing the on-time value ($t_a$) with the presently applied on-time value ($t_b$) for the injector established by the engine control with the aid of the regulator and the calculation model based on the present operating conditions;

D) adjusting the calculation model based on the result of the comparison; and disconnecting an output shaft of the engine from an output shaft of the vehicle's gearbox.

2. A system for controlling an injector of a cylinder in a combustion engine of a motor vehicle, the system comprising:

a data storage medium having a lookup table stored thereon, wherein the lookup table includes preset on-time values (t) for the injector linked to fuel injection quantity values (δ), and further wherein the fuel injection quantity values (δ) represent different desired quantities of fuel to be injected into the cylinder, and the on-time values (t) represent the associated on-times for the injector; and an engine control that includes a regulator, wherein the engine control is operable to determine a present fuel injection quantity values (δ) with the aid of the regulator based on the vehicle's present operating conditions, wherein the engine control includes a processor that is operable to:

A) determine or receive a torque loss value ($T_{loss}$) representing a present torque loss of the engine under the vehicle's present operating conditions and a combustion efficiency value ($\delta_F$) representing a present combustion efficiency of the cylinder under the vehicle's present operating conditions;

B) calculate, based on the torque loss value ($T_{loss}$) and the combustion efficiency value ($\epsilon_F$), an actual fuel injection quantity value ($\delta_{actual}$) representing an actual quantity of fuel injected into the cylinder;

C) determine from the lookup table an on-time value ($t_a$) linked to the actual fuel injection quantity value ($\delta_{actual}$), and compare the on-time value ($t_a$) with a presently applied on-time value ($t_b$) for the injector established by the engine control with the aid of the regulator and the lookup table based on the present operating conditions; and D) adjust the lookup table based on the result of the comparison;

wherein the processor is operable when the output shaft of the engine is disconnected from the output shaft of the vehicle's gearbox.

3. A system according to claim 2, wherein the processor is further operable to:

establish a difference value ($\Delta t$) representing a difference between the presently applied on-time value ($t_b$) and the on-time value ($t_a$); and adjust in the lookup table at least the on-time value linked to the fuel injection quantity value corresponding to the actual fuel injection quantity value ($\delta_{actual}$) by adding the difference value ($\Delta t$) to the on-time value.

4. A computer program loadable in an internal memory of a computer in a motor vehicle, wherein the vehicle has a combustion engine that has an injector of a cylinder controlled by an engine control based on a lookup table that includes preset on-time values (t) for the injector linked to fuel injection quantity values ($\delta$), the on-times for the injector being controlled by the engine control based on the lookup table, wherein the fuel injection quantity values ($\delta$) represent different desired quantities of fuel to be injected into the cylinder and the on-time values (t) represent the associated on-times for the injector, and further wherein the present fuel injection quantity value ($\delta$) is determined by the engine control with the aid of a regulator based on the vehicle's present operating conditions, and further wherein the computer program comprising computer program code for causing the computer:

A) to determine or receive a torque loss value ($T_{loss}$) representing a present torque loss of the combustion engine under the present operating conditions of the vehicle and a combustion efficiency value ($\epsilon_F$) representing the present combustion efficiency of the cylinder under the vehicle's present operating conditions;

B) to calculate, based on the torque loss value ($T_{loss}$) and the combustion efficiency value ($\epsilon_F$), an actual fuel injection quantity value ($\delta_{actual}$) representing an actual quantity of fuel injected into the cylinder;

C) to determine from the lookup table an on-time value ($t_a$) linked to the actual fuel injection quantity value ($\delta_{actual}$), and to compare the on-time value ($t_a$) with a presently applied on-time value ($t_b$) for the injector established by the engine control means with the aid of the regulator and the lookup table based on the vehicle's present operating conditions; and D) to adjust the lookup table based on the result of said comparison.

5. A computer program according to claim 4, further comprising computer program code for causing the computer:

to establish a difference value ($\Delta t$) representing the difference between the present on-time value ($t_b$) and the determined on-time value ($t_a$); and to adjust in the lookup table at least the on-time value linked to the fuel injection quantity value corresponding to the actual fuel injection quantity value ($\delta_{actual}$) by adding the difference value ($\Delta t$) to the on-time value.

6. A computer program according to claim 4, wherein the computer program is stored on a data storage medium readable by an electronic control unit.

7. An electronic control unit comprising an execution device, a memory connected to the execution device and a data storage medium connected to the execution device, a computer program according to claim 4 being stored on the data storage medium.

8. A method for adjusting a lookup table having preset on-time values (t) for an injector of a cylinder in a combustion engine of a motor vehicle linked to fuel injection quantity values ($\delta$), the method comprising:

controlling on times for the injector by an engine control based on the lookup table, wherein the fuel injection quantity values ($\delta$) represent different desired quantities of fuel to be injected into the cylinder and the on-time values (t) represent associated on-times for the injector;

determining present fuel injection quantity values ($\delta$) by the engine control with the aid of a regulator based on the vehicle's present operating conditions, the method further comprising:

A) determining or receiving a torque loss value ($T_{loss}$) representing a present torque loss of the engine under the vehicle's present operating condition, and determining or receiving a combustion efficiency value ($\epsilon_F$) representing a present combustion efficiency of the cylinder under the vehicle's present operating condition;

B) calculating, based on the torque loss value ($T_{loss}$) and the combustion efficiency value ($\epsilon_F$), an actual fuel injection quantity value ($\delta_{actual}$) representing an actual quantity of fuel injected into the cylinder;

C) determining from the lookup table an on-time value ($t_a$) linked to the actual fuel injection quantity value ($\delta_{actual}$), and comparing the on-time value ($t_a$) with a presently applied on-time value ($t_b$) for the injector established by the engine control means with the aid of the regulator and the lookup table, based on the vehicle's present operating conditions;

D) adjusting the lookup table based on the result of the comparison, and disconnecting the output shaft of the engine from the output shaft of the vehicle's gearbox.

9. A method according to claim 8, further comprising executing the method when the output shaft of the engine is disconnected from the output shaft of the vehicle's gearbox, and the engine is idling.

10. A method according to claim 8, further comprising:

establishing a difference value ($\Delta t$) representing a difference between the presently applied on-time value ($t_b$) and the on-time value ($t_a$); and adjusting at least the on-time value linked to the fuel injection quantity value corresponding to the actual fuel injection quantity value ($\delta_{actual}$) in the lookup table by adding the difference value ($\Delta t$) to the on-time value.

11. A method according to claim 8, wherein the injector forms part of a common-rail fuel injection system, and further comprising performing several adjustment cycles, each including the steps A-D, for mutually different values of the common rail pressure.

12. A method according to claim 8, wherein the injector forms part of a common-rail fuel injection system, the method further comprising:

performing a first adjustment cycle comprising the steps A-D using only a main injection of fuel;

performing a second adjustment cycle using a pilot injection and a main injection of fuel and with the same common rail pressure as in the first adjustment cycle;

setting, by the engine control means, a main fuel injection quantity value ($\delta_{main}$), which represents a desired quantity of fuel to be injected into the cylinder by the main injection during the second adjustment cycleand that corresponds to the actual fuel injection quantity value ($\delta_{actual}$) determined in the first adjustment cycle; and determining, by the engine control means with the aid of the regulator based on the vehicle's present operating conditions, a pilot fuel injection quantity value ($\delta_{pilot}$), which represents the desired quantity of fuel to be injected into the cylinder by the pilot injection during the second adjustment cycle, determining or receiving a torque loss value ($T_{loss}$) representing a present torque loss of the engine under the vehicle's present operating conditions and determining or receiving a combustion efficiency value ($\epsilon_F$) representing a present combustion efficiency of the cylinder under the vehicle's present operating conditions;

calculating, based on the torque loss value ($T_{loss}$), the combustion efficiency value ($\epsilon_F$) and the main fuel injection quantity value ($\delta_{main}$), an actual fuel injection quantity value ($\delta_{pilot,actual}$) for the pilot injection representing an actual quantity of fuel injected into the cylinder by the pilot injection;

determining from the lookup table an on-time value ($t_{pilot,a}$) linked to the actual fuel injection quantity value ($\delta_{pilot,actual}$) for the pilot injection and comparing the on-time value ($t_{pilot,a}$) with a presently applied on-time value ($t_{pilot,b}$) for the pilot injection of the injector established by the engine control means with the aid of the regulator and the lookup table based on the vehicle's present operating conditions; and adjusting the lookup table based on the result of the comparison, wherein the second adjustment cycle occurs when an output shaft of the engine is disconnected from an output shaft of the vehicle's gearbox.

13. A method according to claim 8, further comprising performing several adjustment cycles, each including the steps A-D, for mutually different values of the torque loss value ($T_{loss}$).

14. A method according to claim 13, further comprising varying the torque loss value ($T_{loss}$) between different adjustment cycles by adjusting a rotational speed of the engine.

15. A method according to claim 13, further comprising varying the torque loss value ($T_{loss}$) between different adjustment cycles by adjusting gas exchange work of the engine.

16. A method according to claim 15, further comprising adjusting the gas exchange work of the engine by regulating exhaust back pressure by a valve arranged in an exhaust line from the engine.

* * * * *